(12) United States Patent
Craig et al.

(10) Patent No.: US 12,505,489 B1
(45) Date of Patent: Dec. 23, 2025

(54) AUTOMATED RECOMMENDATIONS BASED ON MESSAGE INTERCEPTS

(71) Applicant: United Services Automobile Association (USAA), San Antonio, TX (US)

(72) Inventors: Sean Michael Wayne Craig, San Antonio, TX (US); Mounica Urity, San Antonio, TX (US); Matthew Robert Byrd, Weatherford, TX (US); Noe Alberto Martinez, San Antonio, TX (US); Daniel Nathan Kalinoski, San Antonio, TX (US); Gregory David Hansen, Fuquay Varina, NC (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/337,340

(22) Filed: Jun. 19, 2023

(51) Int. Cl.
*G06Q 40/08* (2012.01)
*G06Q 30/012* (2023.01)

(52) U.S. Cl.
CPC ........... *G06Q 40/08* (2013.01); *G06Q 30/012* (2013.01)

(58) Field of Classification Search
CPC .............................. G06Q 40/08; G06Q 30/012
See application file for complete search history.

(56) References Cited

U.S. PATENT DOCUMENTS

| | | | |
|---|---|---|---|
| 10,997,664 B1* | 5/2021 | McAlister | G06Q 40/08 |
| 2017/0352082 A1* | 12/2017 | Aziz | G06Q 50/40 |
| 2019/0202463 A1* | 7/2019 | Anderson | B60W 30/06 |
| 2020/0062274 A1* | 2/2020 | Kowal | G07C 5/02 |
| 2023/0267694 A1* | 8/2023 | Breitweiser | G06Q 50/16 |
| | | | 345/633 |
| 2024/0127348 A1* | 4/2024 | Ulin | G06N 3/049 |
| 2024/0193696 A1* | 6/2024 | Wyatt | G06Q 40/08 |
| 2024/0202658 A1* | 6/2024 | Tetreault | G06Q 10/087 |

FOREIGN PATENT DOCUMENTS

WO    WO-2018112880 A1 *   6/2018   ............. G01R 31/36

* cited by examiner

*Primary Examiner* — Raven E Yono
(74) *Attorney, Agent, or Firm* — Fletcher Yoder P.C.

(57) ABSTRACT

The present disclosure is directed toward an automated recommendation techniques. In an embodiment, the automated recommendation technique has steps that include accessing user data associated with a user account and identifying product data associated with one or more products, wherein the one or more products are associated with a user of the user account. Furthermore, the method includes determining a status of the one or more products. Additionally, the steps include pushing a recommendation to a user device based on the status of the one or more products.

11 Claims, 4 Drawing Sheets

AUTOMATED RECOMMENDATIONS BASED ON MESSAGE INTERCEPTS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

When making a transaction, a purchased product may be associated with specific product data (e.g., a product name, a product serial number, a product insurance policy, a product warranty, a product expiration date). In some instances, all of the product data may not be made readily apparent to a customer purchasing the product. With this in mind, certain retailers, financial institutions, or services may provide supplementary product data through digital communication. For example, following the purchase of a product, a retailer may send an email to a customer confirming the purchase of the product. However, management of product information can be challenging. Storing hard copies of product manuals and warranties is inefficient. Often problems may occur years after purchase, and customers may not remember where the relevant information can be found.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an automated recommendation method has steps that include accessing user data associated with a user account. The method also includes identifying product data associated with one or more products, wherein the one or more products are associated with a user of the user account. Furthermore, the method includes determining a status of the one or more products. Additionally, the steps include pushing a recommendation to a user device based on the status of the one or more products.

In one embodiment, an automated recommendation system includes a weather monitoring system configured to receive severe weather event data from one or more weather monitoring sensors. The system also includes a processing system configured to a processing system configured to: access location data of a user device associated with the user; identify a location of the user device based on the location data; determine that the location is associated with an upcoming severe weather event based on the severe weather event data; provide a recommendation to move one or more products of the user to a different location based in the upcoming severe weather event; and receive confirmation of movement from a sensor associated with the one or more products.

In one embodiment, an automated recommendation system includes memory storing software instructions and a processing system executing the software instructions on a user device. The processing system is configured to identify, on the user device, digital communications or files associated with a purchase of one or more products; communicate the digital communications or files to a network; and receive, from the network, product data associated with one or more products, wherein the one or more products are associated with a user of the user account. The system also includes a a display configured to display a graphical user interface, wherein the product data is accessible via the graphical user interface.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment"

or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

An individual may have multiple items in their homes or offices that are sufficiently expensive or complex to be associated with dedicated product manuals, documentation, warranties or that qualify to be separately insured. However, a customer may not view all product information at the time of purchase. For example, an online storefront may not display all available insurance policy options at the time of purchase. Furthermore, some products may be covered by existing insurance policies already associated with a user. However, it can be time consuming for a user to compare documentation associated with purchased products with their own insurance coverage or to determine if the product would qualify at all for separate insurance. Similarly, if the status of the product changes (e.g., ages), it can be difficult for a user to understand the implications of the change. In the event of a product failing or requiring replacement, it can be tedious and/or difficult for a user to determine the next steps required to confirm a coverage of an insurance policy and the proper procedures to generate an insurance claim for the one or more products.

The present disclosure is related to providing recommendations to a user based on product data. More specifically, the present disclosure is related to accessing product data associated with a product owned/purchased by the user and generating automated insurance and warranty recommendations based on a status of the product. In certain embodiments, product data may be accessed by the system without input from the user. For example, the system may automatically scan emails or text messages to identify purchased or delivered products and automatically perform recommendation operations or transaction operations as disclosed.

When purchasing one or more products, a customer may desire to know what protective options are available for the product(s). Oftentimes, customers may spend large amounts of money in order to protect the products they own from damage and, in the event of damage, receive compensation based on the amount previously paid. Sometimes this compensation may come from the vendor or service selling the product in the form of warranties. Some products may be covered for certain periods of time under policies provided by the service or vendor such that should the product be damaged or rendered worthless, the customer may be entitled to compensation (e.g., a refund, a replacement, store credit). In some cases, the warranties may be offered for free alongside purchase of the product. In some other cases, the vendors may require additional warranty fees be paid to place the product under a policy.

In some other circumstances, policies may be offered by third party services (e.g., insurance companies, financial institutions, etc.) to provide compensation in the event of damages to one or more products. These policies may take the form of insurance policies, where if damages occur to a product, the insurance company will provide compensation rather than the original seller. Some insurance policies narrowly cover and protect specific products, while some insurance policies broadly cover a range of products. For example, a customer may take out a specific insurance policy on a recently purchased car, or take out an insurance policy covering all of the products owned within a home. Some insurance policies may be directed to cover specific severe events that may occur. For example, a first insurance policy may provide compensation in the event of damages being done via a house fire, while a second insurance policy may only provide compensation in the event of damages being done via a tornado.

Once the product is determined to be damaged by the customer, a user may submit a claim to the vendor if the vendor provides coverage or to the insurance company if the insurance company provides coverage. However, determining which products are covered by warranties, which products are covered by insurance policies, and which products are covered by both can be time consuming for a customer. Whether intentional or not, some vendors and insurance companies may not make compensation information associated with a purchased product readily available to a user. Other times, the information may be made available, but can be easily forgotten by the customer. A customer may purchase a lifetime warranty alongside a product and may forget that a product is covered for replacement fifteen years later upon the product receiving damage. Additionally, it may be difficult to determine if a purchased product qualifies for coverage under an existing insurance policy. For example, it may be unclear to a user who has an auto insurance policy if a Recreational Vehicle (RV) is covered under that policy or if an additional policy would need to be purchased. In general, keeping track of all of the information associated with the warranties and insurance policies of each and every product owned by a user can be difficult and time-consuming. Unfortunately, by not knowing whether a product is covered by an insurance policy/warranty, a customer may lose out on compensation that they are entitled to receive.

In accordance with the present disclosure, an automated recommendation system includes an electronic device, such as a computer or mobile device (e.g., laptop, cell phone, tablet), having an application operating on the device that a user can interact with to generate product data and perform actions as disclosed herein associated with the product data. In an embodiment, a user electronic device may enable a user to enter data inputs indicative of various purchased products and a corresponding status of each product to a product list saved to a user account registered with the insurance application. In other embodiments, the techniques may scrub or otherwise scan data (e.g., texts, emails, other applications) from the electronic device to find product data. The electronic device may also query, via a network (e.g., the Internet), external sources (e.g., remote servers, other user accounts registered with the insurance application) to access information relating to the one or more products on the product list of the user account. For example, the electronic device may query social media sites, search engines, online storefronts, and the like to determine product information relating to the one or more products on the product list of the user account. As an example, a first product on the product list may include a phone recently purchased from an online storefront. The electronic device may query a remote server or server set associated with a search engine (e.g., a web-based search engine) to determine whether the online storefront offers a warranty or coverage policy for the purchased phone. The insurance system may determine that several different warranties associated with the type of phone purchased are also available for purchase. The status of the product (e.g., product status data) may then be saved to the product list (or elsewhere in the user account registered with the insurance application) for later recall by the user and/or the system. In some embodiments, the electronic device may automatically execute an action corresponding to the status of the product, such as automatically signing up a user for a warranty policy associated with a recently purchased product.

As noted above, the electronic device may be configured to present information on a display of the electronic device, the information being viewable on the display by the user. In some embodiments, the electronic device may present information indicative of various options for the user associated with the product data on the product list. For example, the electronic device may present to the user information indicative of a first warranty for five years of coverage and a second warranty for ten years of coverage. The user may then utilize an input/output interface, in some embodiments corresponding with the display, to select one of the options. The user may also be able to select an option to not purchase or sign up for any warranty of insurance policy.

Further, a tunable algorithm (e.g., artificial intelligence algorithm, machine learning algorithm) associated with the insurance application may be employed to access information and complete various actions corresponding to the products included in the product list. The algorithm may employ text recognition features to categorize the products under one or more categories of product (e.g., a house, a car, an electronic device, an appliance, etc.) included in the product list, and may employ other features utilized to access information and types of useful data relating to the various products. In some embodiments, the electronic device may be configured to receive a data input indicative of a usefulness of the information provided by the electronic device, the information presented on the display to the user, and/or the actions taken by the insurance application relating to the various products (e.g., automatically recommending one or more insurance policies or warranties). As an example, the user may enter a data input indicating that the information presented on the display is very useful, useful, or not useful. The tunable algorithm utilized to automate pushing insurance recommendations corresponding to various product statuses may be updated or changed based on the data input(s) indicative of the usefulness of information presented to the user. As an example, a primary source utilized by the tunable algorithm may be changed based on the data inputs indicative of usefulness of previous recommendations. In this way, the algorithm may be characterized, in some embodiments, as an artificial intelligence algorithm and/or a machine learning algorithm.

Further, the tunable algorithm associated with the insurance application may be employed to scan one or more other applications on the electronic device (e.g., email application, text messaging application, calendar application) that are not associated with the insurance application. The tunable algorithm may identify one or more products purchased in the other applications. The tunable algorithm may also employ text recognition to differentiate whether a digital communication includes information related to the purchase of a product. In an embodiment, the tunable algorithm may use text recognition to identify text strings (e.g., "purchase", "bought", "receipt", "delivered", "shopping", etc.) and identify associated text as a purchased product. For example, the tunable algorithm may identify a block of text in the messaging application of the electronic device from a trusted number that contains the text strings "receipt", "purchase", and "phone". The tunable algorithm may then generate product data within the insurance application corresponding to a newly purchased phone. The product data associated with the product may include a purchase price, a model name, a vendor/storefront name, and the like associated with the text strings identified via the tunable algorithm. After the product data is generated, the insurance application may generate or add to the product list comprising the product data.

By employing the above-described tunable algorithm and automated features, the insurance application may enable a user to efficiently apply for and receive compensation for damages to products through insurance policies and warranties available. Present embodiments may utilize available product data to generate needed insurance and warranty recommendations for users that are not otherwise currently available. These and other features are described in detail below.

Figure 1:
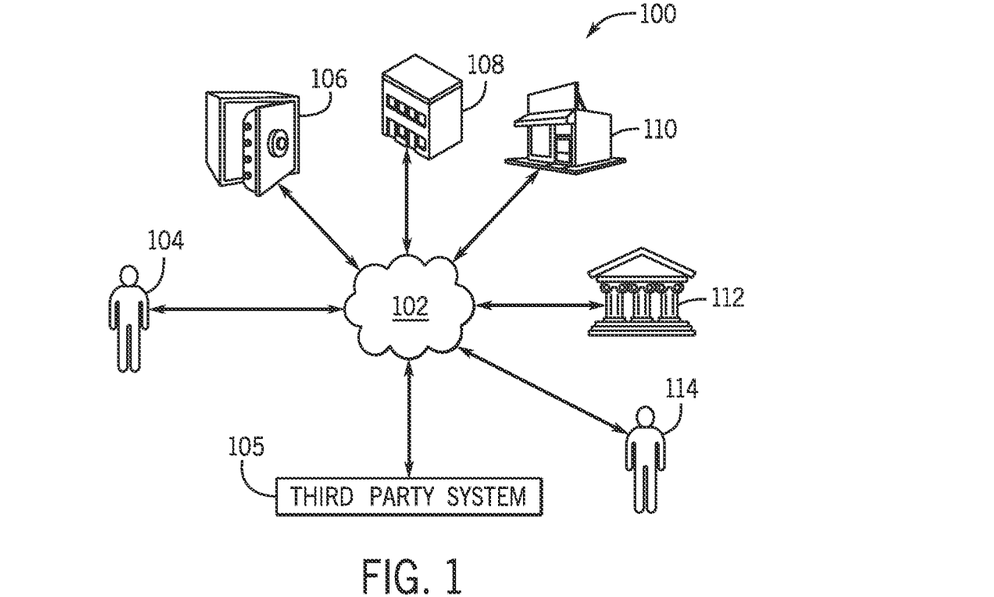
FIG. 1 is a schematic illustration of an environment in which an automated recommendation system may operate, in accordance with an aspect of the present disclosure.

With the preceding in mind, the present disclosure details various embodiments for automatically generating an insurance recommendation for a user based on a status of one or more products. FIG. 1 illustrates an example environment 100 in which an automated recommendation system 102 may operate, in accordance with embodiments described herein. In one embodiment, the automated recommendation system 102 may receive data related to one or more products (e.g., an electronic device, a vehicle, a home, a property, food, an appliance, etc.) directly from a vendor (e.g., from a point-of-sale terminal, from an online checkout) or indirectly from a third-party in communication with the vendor and the user 104 (e.g., third party system 105). As discussed herein, the automated recommendation system 102 may include or access devices present at the point-of-sale.

As discussed herein, a user 104 can be a customer or member of an organization that manages, administers, or is otherwise affiliated with the automated recommendation system 102 to facilitate the transaction of retail, financial, or commercial products as well as to identify when such products have data (e.g., insurance data, warranty data, lifespan data, expiration data) associated with them. For example, the system 102 can be administered by an insurance or financial services entity with which the user 104 has an account. The automated recommendation system 102 may facilitate detection of a status of the one or more products in real-time, i.e., at the time of the transaction or during ownership by a user 104. The product data accessed and/or used by the automated recommendation system 102 can be stored in a memory and the system 102 is present on or is otherwise able to access the product data locally in this manner.

In certain embodiments, various data pertaining to the user 104, a vendor, a financial institution (e.g., a bank, brokerage firm, insurance company, and so forth) and/or other entity is at least partially stored in servers of a cloud storage system 106. Other data relevant to the product and/or generated recommendation may be provided by companies and institutions 108 (e.g., educational institutions, government institutions, healthcare organizations), merchants and retailers 110, financial institutions 112, and other users 114.

Figure 2:
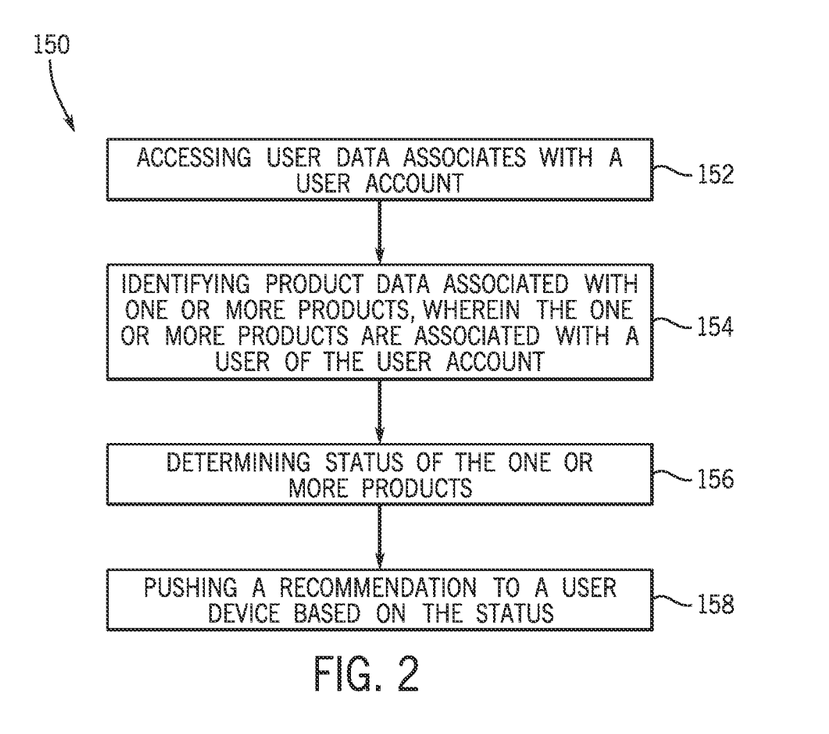
FIG. 2 is a process flow diagram illustrating an algorithm of an automated insurance system, in accordance with an aspect of the present disclosure.

FIG. 2 is a process flow diagram illustrating a method 150 of operation of an automated recommendation system 102. In the illustrated embodiment, the method 150 includes accessing (block 152) user data associated with a user account. The user data may include information about the user 104. For example, the user data may include information about insurance companies associated with the user 104, information about financial institutions (e.g., banks) associated with the user 104, previous insurance policies and warranties held by the user 104, previous claims filed to receive compensation by the user 104, current insurance policies and warranties held by the user 104, etc. The current insurance policy information may include data associated with what products are covered under each insurance policy, data associated with an expiration for the current policies, data associated with who is able to receive compensation for damages under a current insurance policy, and the like. The relevance of the user data may range from not relevant to highly relevant. This might be displayed on a user device via the display as importance qualifiers such as "not important", "somewhat important", "highly important", "crucially important", and the like.

In some embodiments, the method 100 may additionally scan one or more other applications on the user device 12 (e.g., email application, text messaging application, calendar application) that are not associated with the automated recommendation system 102 to access the user data. The algorithm may identify user data generated in the other applications. The algorithm may also employ text recognition to determine whether information found on the other applications should be categorized as user data. In some embodiments, the algorithm may use text recognition to identify text strings (e.g., "insurance", "policy", "damages", "compensation", etc.) and identify associated text as the user data. For example, the algorithm may identify a received email in a messaging application of the user device 12 that contains the text strings "insurance" and "renewed". The algorithm may then utilize the accessed user data for the automated recommendation system 102 to determine an existing insurance policy held by the user 104.

In some other embodiments, the user data may be manually entered into the automated recommendation system 102. The user 104 may directly enter input user data via an input/output (I/O) interface. The automated recommendation system 102 may prompt the user 104 to input data via a visual display. For example, the insurance application may push a notification to a user device prompting the user 104 to input user data.

The method 150 also includes identifying (block 154) product data associated with one or more products, where the one or more products are associated with the user 104. Identifying the product data may include determining the types of products purchased by the user 104 or by an individual associated with a user account. For example, the product data may include an amount of products purchased (e.g., a dozen eggs), a type of product purchased, a price of the product purchased, when the product was purchased, where the product was purchased, the vendor associated with selling the product, a payment method associated with the purchase of the product, and the like. As with accessing the user data, the automated recommendation system 102 may similarly employ means to access product data generated in other applications. The automated recommendation system 102 may scan one or more other applications on the user device 12 (e.g., email application, text messaging application, shopping application) that are not associated with the automated recommendation system 102 to access the product data. The algorithm may also employ text recognition to determine whether information found on the other applications should be categorized as product data. The algorithm may then utilize the accessed user data for the automated recommendation system 102 to determine an existing insurance policy held by the user 104.

The automated recommendation system 102 may also identify product data associated with products already under ownership of the user 104. For example, a user 104 may wish to provide information to the automated insurance application that the user 104 has owned and lived in a house for the past ten years. In this way, the user 104 may selectively allow the automated recommendation system 102 access to some product data while restricting other product data. A user 104 may not wish to store data associated with every owned item within the insurance application. Indeed, in some embodiments, the user 104 may restrict the access of the automated recommendation system 102 so that it is unable to scan or otherwise access certain applications on the user device. In some other embodiments, the automated recommendation system 102 may take into consideration user preferences of the user data associated with what type of product data is saved. Product data may be selectively filtered or retained based on an identified characteristic associated with the product. For example, a user 104 may indicate that all purchased products less than ten dollars should not have any product data associated with the product saved to the insurance application for use in the automated insurance application. In another example, product data for purchases above $1000 or all furniture purchases are tracked. In some cases, product value changes with age. For example, furniture that is more than 10 years old may have decreased value, In such cases, it may be nonetheless beneficial to retain records of original purchase price and also ensure that the insurance coverage is replacement level rather than priced at the current value.

The method 150 also includes determining (block 156) a status of the one or more products. Information associated with the one or more products may be identified prior to a user 104 needing to make a claim based on damages to the associated product. For example, a user 104 may purchase a new car that does not require an insurance claim until five years after the purchase of the car. In this way, product data may be stored by the automated insurance method (e.g., to a server, a database, the memory of the user device, etc.) for later recall based on a status of a product. The status of the one or more products may include a current efficiency of a product, a current operability of a product, a downtime of a product, an amount of damages done to a product, a detected defect of a product, and the like. For example, the automated recommendation system 102 may determine that a product is unable to turn on when prompted by a user 104. In some embodiments, the product may be an electronic device that is able to transmit this information automatically to the automated recommendation system 102. For example, the automated recommendation system 102 may determine that a refrigerator has stopped projecting a confirmation signal, indicating that the product no longer is operational.

In some embodiments, the user 104 may input a status of each product of the one or more products. The user 104 may add, delete, or modify a status of the product determined by the automated recommendation system 102. The user 104 may be able to provide additional details that the automated recommendation system 102 may be unable to determine. Some products owned by the user 104 may not have digital communication capabilities and require additional steps in order for the automated recommendation system 102 to determine its status. For example, a home built prior to an integration of digital communication may have damage done to the shingling on the roof. However, devices associated with the house may have no direct way of communicating the status of the house to the automated recommendation system 102. In this example, the user 104 may be prompted to provide additional details associated with the status of the house that would otherwise be undetected. In this way, the automated recommendation system 102 is able to determine a status of the one or more products owned by or associated with the user 104.

The method 150 further includes pushing (block 158) a recommendation to the user device based on the status of the product. The status of the product may further include whether or not the product is covered under an existing insurance policy held by the user 104 or an individual associated with the user account. In some embodiments, the recommendation pushed to the user device may prompt the user 104 to indicate if they wish to add a product that is not currently covered under an existing insurance policy to the existing insurance policy. In some other embodiments, the recommendation may include several recommended insurance policies not already owned by the user 104 for the user 104 to purchase in order to cover products. The recommendation may include several options to choose from. For example, the recommendation may include a first insurance policy, a second insurance policy, a third insurance policy, or no insurance policy to choose between. The user 104 may be asked via the recommendation if they would like to purchase any of the presented insurance policies or to leave the product uninsured.

In some other embodiments, the recommendation may be automatically implemented based on preference data of the user data. For example, the user 104 may adjust a setting to automatically add any new cars purchased to their vehicle insurance policy when the automated recommendation system 102 determines a status of a newly purchased, uninsured car. In some embodiments, the user 104 may input preference data indicating that the automated recommendation system 102 use specific weighting to determine a recommendation. The preference data may include weighted preference data, which allows for a user 104 to determine specific factors that influence which recommendations they are pushed. For example, a user 104 may wish to purchase insurance policies with greater damage compensation for products over ten thousand dollars. In this way, the automated recommendation system 102 may take the preferences into account and push a greater number of recommendations associated with higher-payout insurance policies than lower-payout insurance policies. The preference data may allow the user 104 to better customize the recommendations pushed to them by the automated recommendation system 102.

Figure 3:
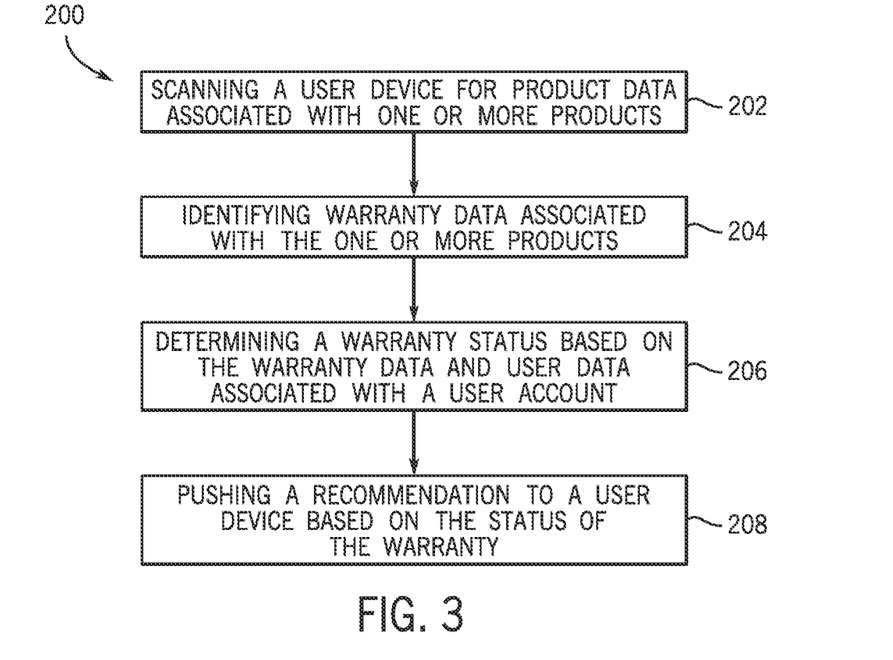
FIG. 3 is a process flow diagram illustrating an algorithm of an automated recommendation system configured to detect warranties, in accordance with an aspect of the present disclosure.

FIG. 3 is a process flow diagram illustrating a method 200 of operation of the automated recommendation system 102 configured to push recommendations associated with a warranty associated with the one or more products. In the illustrated embodiment, the method includes scanning (block 202) a user device for product data associated with one or more purchased products. In some embodiments, the automated recommendation system 102 may scan the user device similarly to the aforementioned way that the automated recommendation system 102 scans the user device in order to identify (block 154) product data associated with the one or more products. For example, the automated recommendation system 102 may scan one or more other applications on the user device (e.g., email application, text messaging application, shopping application) that are not associated with the automated recommendation system 102 to access the product data. The algorithm may also employ text recognition to determine whether information found on the other applications should be categorized as product data. As previously described, the product data may include an amount of products purchased, a type of product purchased (e.g., an electronic device, a car, a house), a price of the product purchased, when the product was purchased, where the product was purchased, the vendor associated with selling the product, a payment method associated with the purchase of the product (e.g., cash, a credit card, a check), and the like.

In some embodiments, the product data scanned via the method 150 may be used in the method 200 and vice versa. The automated recommendation system 102 may be configured to perform scans at predetermined time intervals. During each scan of the user device, product data may be stored within the insurance application, the memory of the user device, a database, or some combination thereof. During each scan, the automated recommendation system 102 may be configured to add to, delete from, or otherwise modify the stored product data. The automated recommendation system 102 may scan one or more other applications on the user device associated. In some embodiments, the automated recommendation system 102 may be configured to scan all other applications and digital resources for the product data. In some other embodiments, the user preference data may influence the automated recommendation system 102 to scan a fewer number of applications. A user 104 may set the automated recommendation system 102 to only scan certain applications while not allowing the automated recommendation system 102 to scan a second set of applications. Similarly, within an allowed application, a user 104 may still restrict access to the automated recommendation system 102 between certain types of messages. For example, the automated recommendation system 102 may have a list of stored phone numbers, email addresses, contact information, etc. from trusted sources (e.g., an online storefront, a financial institution). The automated recommendation system 102 may be limited to access applications and contacts within the applications that the user 104 has indicated as allowable via preference data.

The method 200 also includes identifying (block 204) warranty data associated with the one or more products. Based on the product data scanned by the automated recommendation system 102, the automated recommendation system 102 may search for warranty data associated with each product of the one or more products. In this way, the identified warranty data would be warranty data that corresponds with the products owned and/or purchased by the user 104. The warranty data may include prices of warranties for the owned products, types of the warranties, expiration dates of the warranties, compensation associated with the warranties, the warranty provider(s), methods to sign up for the warranties, and the like. For example, the automated recommendation system 102 may identify product data associated with a new phone purchased by the user 104. The automated recommendation system 102 may then identify warranty information associated with the purchased phone. In some embodiments, the automated recommendation system 102 may scan an application associated with the sale of the product for additional warranty information. In some embodiments, the automated recommendation system 102 may use a network connection to query a network (e.g., the Internet) for warranty information. For example, a vendor may not provide any digital communication directed to the user 104 that includes warranty information. Instead, the vendor may include separate information available on a webpage associated with the vendor and/or a third-party source that may include the warranty data. The search via the network may be refined based on the scanned and stored product data. For example, with product data indicating the purchase of a new phone model, the automated recommendation system 102 may refine its search by only searching for warranty data associated with the new phone model. In this way, the automated recommendation system 102 may be made more efficient in its identification of the warranty information.

The method 200 also includes determining (block 206) a warranty status based on the warranty data and user data associated with the user account. The automated recommendation system 102 may be used to identify the warranty status of the one or more purchased products associated with a user 104 and/or a user account. The warranty status may include information about whether or not a product indicated by the product data has a warranty already applied to it, information about when an existing warranty expires, information about a status of the product covered by a warranty, when a warranty would need to be applied to receive certain benefits, and the like. Each product may be associated with one or more warranty statuses determined by the automated recommendation system 102. The warranty status of any given product may change depending on whether or not a warranty has expired, if a new warranty has been purchased, if a warranty has been modified, or any combination thereof. For example, the automated recommendation system 102 may determine that the user 104 of a recently purchased phone does not have a warranty associated with the phone. The automated recommendation system 102 may determine that the warranty status of the phone is that it does not currently have a warranty or is out of warranty. The user 104 may be able to view a warranty status of each owned product via the display of the user device. In some embodiments, the warranty status may be shown as a text string, such as "has a warranty" or "does not have a warranty". Similarly, the visual display may indicate an expiration date associated with the warranty status. For example, the user device may display a number of days until the warranty expires. In some embodiments, colors may be used to indicate an amount of time remaining on the warranty and whether the product has a warranty (e.g., a green color associated with a first product that has a warranty that will last for a longer period of time, a yellow color associated with a second product that has a warranty that will last for a shorter period of time, a blue color associated with a third product that does not have a warranty but that is still available for a longer period of time, and a red color associated with a fourth product that does not have a warranty and that the available warranties will last for a shorter period of time).

The method 200 also includes pushing (block 208) a recommendation to a user device based on the warranty status. Depending on the determined warranty status associated with a product, the automated recommendation system 102 may be prompted to push a recommendation to the user 104. In some embodiments, the recommendation pushed to the user device may prompt the user 104 to indicate if they wish to add a warranty to a product that is not currently covered under an existing warranty. For example, the automated recommendation system 102 may identify that a first product owned by a user 104 is not covered under a warranty. The system 102 may utilize the identified warranty data to determine available warranties that cover the first product. The available warranties may be pushed to the user 104 via a warranty recommendation so that the user 104 may choose between several available warranties for the one or more identified products. The warranty recommendation may prompt a user 104 to interact with the recommendation via an I/O interface to confirm a selection of a specific option. For example, the visual display may include a button to apply an available warranty to a product and a button to not apply an available warranty to the product.

Similarly to the aforementioned insurance recommendation, in some other embodiments, the warranty recommendation may be automatically implemented based on preference data of the user data. For example, the user 104 may adjust a setting to automatically apply any free warranties available without input from the user 104. In some embodiments, the user 104 may input preference data indicating that the automated recommendation system 102 use specific weighting to determine a recommendation. The preference data may include weighted preference data, which allows for a user 104 to determine specific factors that influence which recommendations they are pushed. For example, a user 104 may only wish to add warranties to products above a threshold price value (e.g., one hundred dollars, five hundred dollars, one thousand dollars, ten thousand dollars, etc.). In this way, the automated recommendation system 102 may take the preferences into account and push a greater number of recommendations associated with warranties for products of higher value and a lower number of recommendations with warranties for products of lower value.

Figure 4:
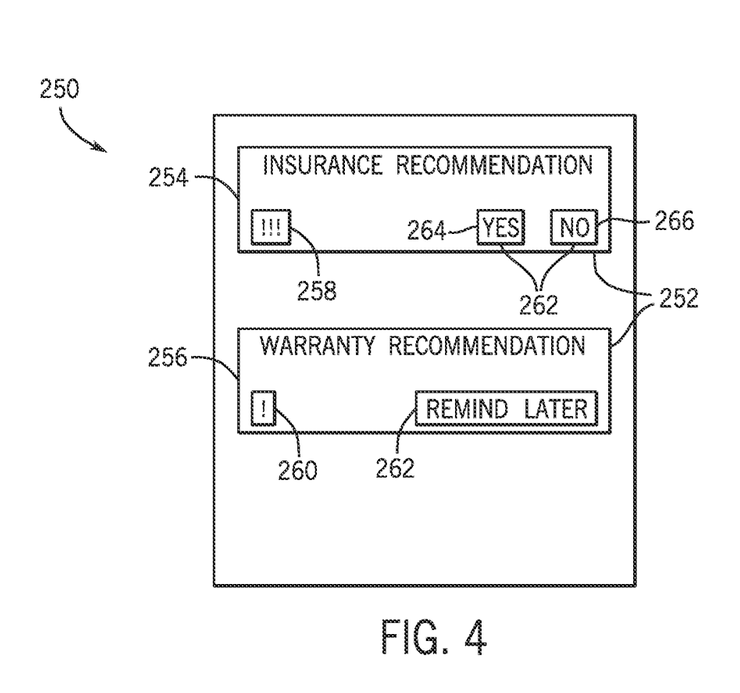
FIG. 4 is a schematic illustration of a graphical user interface (GUI) of the automated recommendation system that permits user access to product data, in accordance with an aspect of the present disclosure.

FIG. 4 is a schematic illustration of a graphical user interface (GUI) 250 of the automated recommendation system 102 that permits user input and interaction. The GUI 250 may be presented via a combined display and I/O interface, as shown. In the illustrated embodiment, the GUI 250 displays several recommendations 252 generated via the automated recommendation system 102. Specifically, FIG. 4 illustrates an insurance recommendation 254 (e.g., the insurance recommendation pushed to the user device via the method 150) and a warranty recommendation 256 (e.g., the warranty recommendation pushed to the user device via the method 200).

In some embodiments, the pushed recommendation 252 may be associated with a level of importance. The level of importance may be used to indicate to the user 104 a relevance of the pushed recommendation 252 to the user 104. In some embodiments, the level of importance of each product may be associated with the user preference data obtained from the user 104. The user 104 may modify the user preference data in order to adjust how important certain types of recommendations 252 are to them. For example, a user 104 may indicate in the user preference data that a recommendation 252 associated with an expiring insurance policy/warranty owned by the user 104 is of a higher importance level than a recommendation 252 suggesting a warranty or insurance policy for a recently purchased product. The level of importance may be displayed to the user 104 in several different forms. For example, the level of importance may be shown as a text string saying "important," "not important," "very important," etc. The level of importance may also be emphasized via characteristics displayed to the user 104, such as a color of the recommendation 252, a size of the recommendation 252, an alert sound of the recommendation 252, and the like. In some embodiments, the level of importance may be indicated via other visual displays. As shown in the illustrated embodiment, the level of importance may be indicated through the GUI 250 via a number of exclamation points associated with the recommendations 252. A first level of importance indicator 258 of a first recommendation 254 may show three exclamation marks, indicating a high level of importance, while the second level of importance indicator 260 of a second recommendation 256 may show one exclamation mark, indicating a lower level of importance with respect to the first recommendation 254.

In some embodiments, the pushed recommendation 252 may include a pop-up or reminder prompting the user 104 to input additional information associated with the specific recommendation 252. As shown in the illustrated example, the automated recommendation system 102 may have several input icons 262 displayed on the GUI 250 to receive a user input. In some embodiments, the user 104 may be prompted to tap or click on an input icon 262 in order to provide a desired input. In some embodiments, the user 104 may be prompted with a question via the recommendation 252, and given an affirmative input icon 264 and a non-affirmative input icon 266 to provide user input. For example, the user 104 may be prompted via the user device as to whether they would like to add a purchased product to an insurance policy that is already owned. The GUI 250 may display the question with several input icons stating "YES" or "NO." In some embodiments, the recommendation 252 may include an input icon 262 for a user 104 to respond at a later point in time. For example, the recommendation 252 may have an additional input icon 262 that contains the text string "RESPOND LATER." As shown in the illustrated embodiment of the GUI 250, the automated recommendation system 102 may allow for the user 104 to provide feedback and respond to the recommendations 252 as seen fit.

The one or more products associated with the pushed recommendations may vary in scope. In some instances, individuals may purchase insurance for the one or more products to mitigate or recoup financial losses after a severe event (e.g., a storm, a tornado, a flood, a hurricane, a fire, a blizzard, a heat wave, etc.) causes damage to the individual's product(s). Prior to the severe event occurring, the system 102 and/or the user 104 may receive communications via a user device (e.g., a phone, a laptop, a tablet, etc.) associated with the incoming severe event in the form of severe event data (e.g., a predicted type of severe event, a predicted time of the severe event). In some embodiments, the automated recommendation system 102 may be configured to access the severe weather data from a weather sensor using a weather monitoring system. The automated recommendation system 102 may generate recommendations associated with the one or more products owned by the user 104. For example, if the automated recommendation system 102 determines that a severe event associated with high temperatures is approaching, a user 104 may be prompted via a pushed recommendation to regularly check the product status of an air conditioning system. In another embodiment, the recommendation may be related to an upcoming or predicted severe event or severe weather event, such as a flooding event or a hurricane event. In such cases, the recommendation may be a recommendation to move the product to a safer location (e.g., move a vehicle to higher ground or a higher floor of a parking garage, move an RV to an inland storage facility). The system 102 may include access to on-board sensors or GPS information of the vehicle to automatically determine if the recommendation was followed. In an embodiment, the location information may include altitude information that can be referenced by the system to determine if the vehicle is at a sufficiently high location to avoid a worst case scenario flooding associated with the upcoming severe event. For example, if a flood is estimated to be around 2 meters, a determined vehicle altitude of 5 meters is determined to be sufficiently high. If the user is determined, based on vehicle location data, to have followed the recommendation in advance of the severe event, the system 102 may provide a reward, such as discounted insurance coverage.

After the event occurs, the individual is able to submit an insurance claim to their respective insurance company that may initiate an insurance claim process. In traditional systems, the individual may initiate a claim by calling their insurance agent or initiating an application that is associated with their insurance company, thereby allowing the individual to enter data and information related to the status of their products (e.g., damages to the product, a downtime of the product, etc.). That is, individuals may be prompted to input data related to a currently held policy such that the application (e.g., claim processing application) can access the policyholder's information to determine what type of events are covered, amounts of damage covered, and the like. Further, the policyholder may provide information related to the particular severe event that occurred (e.g., type of severe event, time of the severe event) to populate fields of an insurance claim, as well as to product data associated with the damaged product(s). For property and casualty claims, the burden is often on the policyholder to report damage related to the policyholder's property, and based on the information submitted, an insurance adjuster will inspect and assess the damage to determine an appropriate amount of compensation to replace the property and/or make repairs. However, traditional insurance claim processing systems and methods may have downsides due to the lack of familiarity with third party applications that may be used to collect product status data, and the difficulty associated with providing the necessary information to process the insurance claim.

Indeed, as insurance companies become more capable of passively receiving and analyzing data from various data sources, the insurance companies may use the received product data associated with a status of the one or more products to initiate insurance claim processes without an individual engaging a third-party application. Moreover, an improved ability to monitor and receive product data related to a status of a product associated with an individual provides insurance companies an improved ability to efficiently process insurance claims while limiting a client's time in which they participate in the claims process. For instance, in the event of a power outage, the automated recommendation system 102 may determine an amount of time a refrigerator lost power, and appraise a value of food lost under an insurance policy of the user 104. Similarly, the automated recommendation system 102 may determine if an electronic device never returned to being online and appraise a value for a replacement of the product under the insurance policy.

Figure 5:
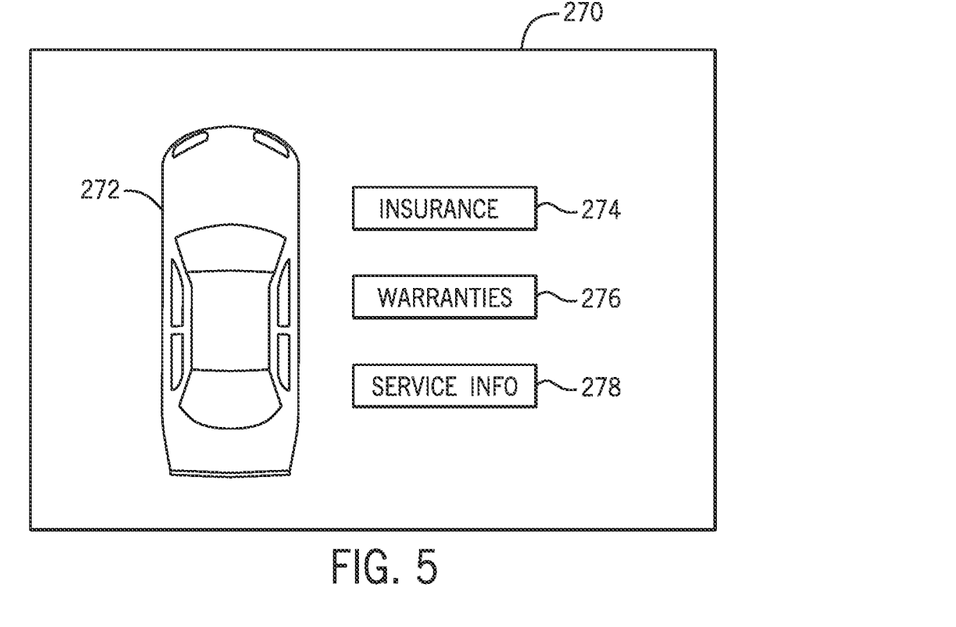
FIG. 5 is a schematic illustration of a graphical user interface (GUI) of the automated recommendation system that permits user input and interaction, in accordance with an aspect of the present disclosure.

FIG. 5 shows an example GUI 270 that includes an icon 272 of a product of the user, illustrated here as a vehicle. Via the GUI 270, the user can access various compiled product data, such as via an icon 274 representative of insurance information, an icon 276 representative of warranty information, or an icon 278 representative of service information.

In one example, the system 102 may scan a user mobile device to identify emails that are indicative of changes to warranty information. For example, the warranty information may exclude certain items or may have a changed user agreement. Not only can the warranty document itself be accessed via the icon 276, but also the text of the user email relating to the warranty can be stored in an image or text file that is also accessible via the icon 276. In one example, clicking the icon 276 brings up a screen with thumbnails for associated files, which themselves can be accessed by clicking. In this manner, product data for the vehicle that is indexed by the system 102 as "warranty information" is accessible via the icon 276. The product data may be extracted from emails or may be manually entered by the user. For example, the user may receive physical mail related to the warranty and may take an image of the physical mail using a camera of the user device. The image can be associated with the vehicle warranty using an application of the system 102 operating on a user device, via a user input screen of a graphical user interface. Other data, such as receipts or evidence of warranty payment, may also be provided by the user or extracted from user data. Thus, the documents accessible via the icon 276 may include a mix of official warranty documents and any other information identified as useful by the user.

While the illustrated example relates to a vehicle, other products may also be illustrated, such as consumer products.

With this in mind, the advent of systems and methods that may track, monitor, and automatically detect incoming severe events has made preparing for and initiating insurance claims more feasible. That is, it may be beneficial to provide systems and methods that can receive alerts related to a location associated with the user 104, thereby anticipating an incoming change in the status of the one or more products owned by the user 104, as well as determining if a change in the status of the one or more products does occur in order to begin the insurance claim process.

The present embodiments described herein may detail various hardware components and methodologies that may enable an insurance holder to automatically initiate an insurance claim process based on received product status data, thereby providing a policyholder the ability to expedite the insurance claim process. Additional details related to initiating these insurance claim processes will be discussed in detail below with reference to FIG. 6.

Figure 6:
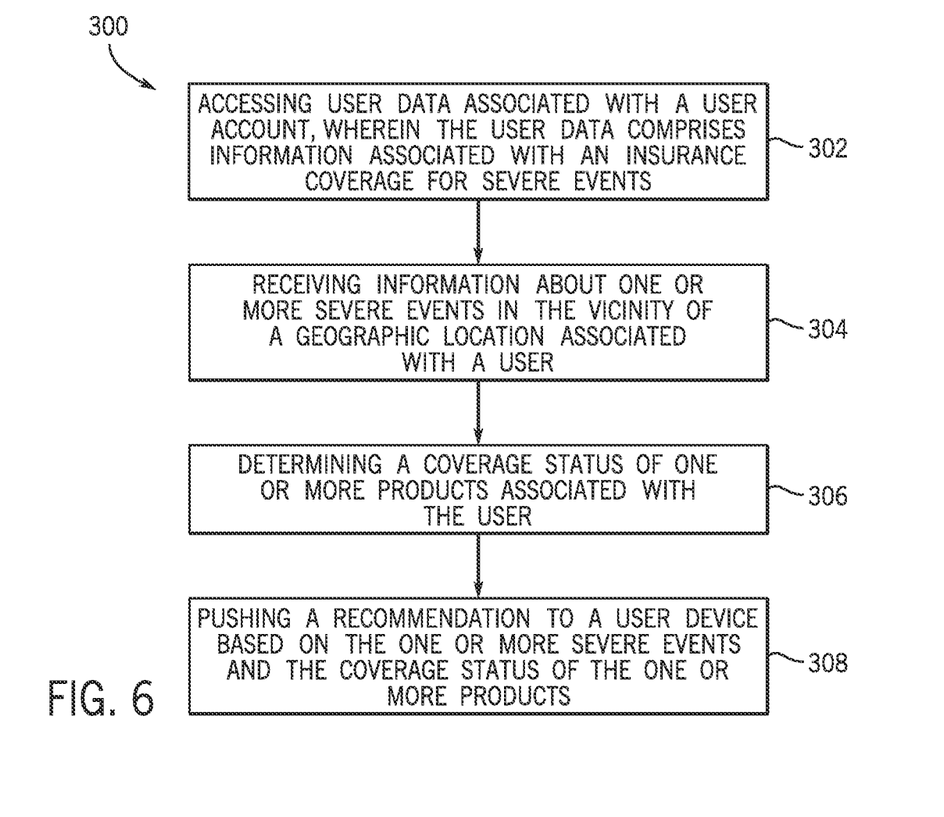
FIG. 6 is a process flow diagram of an algorithm of an automated recommendation system configured to detect severe events, in accordance with an aspect of the present disclosure.

FIG. 6 depicts is a process flow diagram of a method 300 of an automated recommendation system 102 configured to detect severe events. The method 300 includes accessing (block 302) user data associated with a user account. In some embodiments, the user data includes information associated with an insurance coverage for severe events. For example, the user data may include product data about existing products owned by a user 104 or an individual associated with a user account. The user data may also include information about insurance policies currently held by the user 104. In some embodiments, the insurance policies may provide coverage for products in the event of damages from a severe event. The automated recommendation system 102 may prompt the user 104 to provide user data associated with the currently held insurance policies. In some embodiments, the automated recommendation system 102 may be in digital communication with an insurance application, an insurance company, or both. In this way, the automated recommendation system 102 may automatically scan a user device in order to access the user data associated with relevant insurance policies.

The method 300 includes receiving (block 304) information about one or more severe events in the vicinity of a geographic location associated with the user 104. As previously discussed, the automated recommendation system 102 may be configured to automatically scan a user device associated with the user 104, with which the insurance application is stored on. In some embodiments, the automated recommendation system 102 may be configured to scan a user device for information about one or more severe events. In some embodiments, the severe events may be upcoming severe events. For example, the automated recommendation system 102 may receive information about a hurricane that is expected to pass over the city in which the user 104 is located.

The automated recommendation system 102 may scan a number of applications (e.g., weather applications, news applications, location applications) in order to determine a status of an upcoming severe event as well as the location of a user 104 or products owned by the user 104. The system 102 may then determine which products may be most at risk of being in a location of a severe event at the time of the severe event. For example, the system 102 may identify a tornado that is expected to touch down in a geographical area that a user 104 has a house located. The automated recommendation system 102 may make the connection and generate data associated with the products in the geographic area.

In some embodiments, the system 102 may receive information about severe events that are more likely to take place within a specific geographic area. For example, the system 102 may receive information corresponding to a user 104 moving to a new location or purchasing a product to be kept in a new location that is more prone to experience specific weather patterns. While a hurricane may not be expected to strike soon, the system 102 may receive information that a recently purchased home is located in a geographical area that is more prone to receive hurricanes than other geographical areas.

The method 300 also includes determining (block 306) a coverage status of one or more products associated with the user 104. Coverage status data may be stored by the automated insurance method (e.g., to a server, a database, the memory of the user device, etc.) for later recall based on a coverage status of a product. The coverage status of the one or more products may include whether or not a product is covered if the product is damaged via severe weather event. For example, the system 102 may identify one or more products of the products associated with the user 104 as covered under a particular insurance policy. In some embodiments, the system 102 may assign a different classification to each product based on its current status. For example, the system 102 may determine that a product is insured, is not insured but can be added to an existing policy, is not insured and requires a new policy, is insured but may expire soon, etc.

In some embodiments, the user 104 may input a coverage status of each product of the one or more products. The user 104 may add, delete, or modify a coverage status of the product determined by the automated recommendation system 102. The user 104 may be able to provide additional details that the automated recommendation system 102 may be unable to determine. As mentioned previously, some products owned by the user 104 may not have digital communication capabilities and require additional steps in order for the automated recommendation system 102 to determine its status. For example, a home built prior to an integration of digital communication may have an insurance policy taken out on it to provide compensation in the event of a tornado. However, the house may have no direct way of communicating the coverage status of the house to the automated recommendation system 102. In this example, the user 104 may be prompted to provide additional details associated with the status of the house that would otherwise be undetected. In this way, the automated recommendation system 102 is able to determine a coverage status of the one or more products owned by or associated with the user 104.

The method 300 further includes pushing (block 308) a recommendation to a user device based on the one or more sever events and the coverage status of the one or more products. In some embodiments, the recommendation pushed to the user device may prompt the user 104 to indicate if they wish to add a product that is not currently covered under an existing severe weather insurance policy to the existing insurance policy. The recommendation may include several options to choose from. The user 104 may be asked via the recommendation if they would like to purchase any of the presented insurance policies or to leave the product uninsured.

In some embodiments, the recommendation may be based on a status of the one or more products following the severe event. If one or more products are damaged during the severe event, the system 102 may automatically push a recommendation to a user device associated with the existing damages. For example, the automated recommendation system 102 may automatically detect that a refrigerator that lost power during a severe event did not return to power alongside other appliances. Based on the coverage status of the refrigerator, the system 102 may push a recommendation to a user device indicating that the user 104 is entitled to compensation for the damages to the refrigerator under an insurance policy. The recommendation may further include instructions on how to file the claim, or prompt the user 104 to file the claim via one or more input icons, as shown in FIG. 4.

In some other embodiments, the recommendation may be automatically implemented based on preference data of the user data. For example, the user 104 may adjust a setting to automatically file an insurance claim for a damaged product when the automated recommendation system 102 determines a status of a product to be damaged. In some embodiments, the user 104 may input preference data indicating that the automated recommendation system 102 use specific weighting to determine a recommendation. The preference data may include weighted preference data, which allows for a user 104 to determine specific factors that influence which recommendations they are pushed. The preference data may allow the user 104 to better customize the recommendations pushed to them by the automated recommendation system 102 and more efficiently file claims for products that they may have otherwise failed to receive proper compensation for. In this way, the automated recommendation system 102 may allow a user 104 to better keep track of the numerous products they own and the insurance policies and warranties that cover each of them, while automatically taking the necessary steps to maintain coverage of the products and receive proper compensation for damages.

Figure 7:
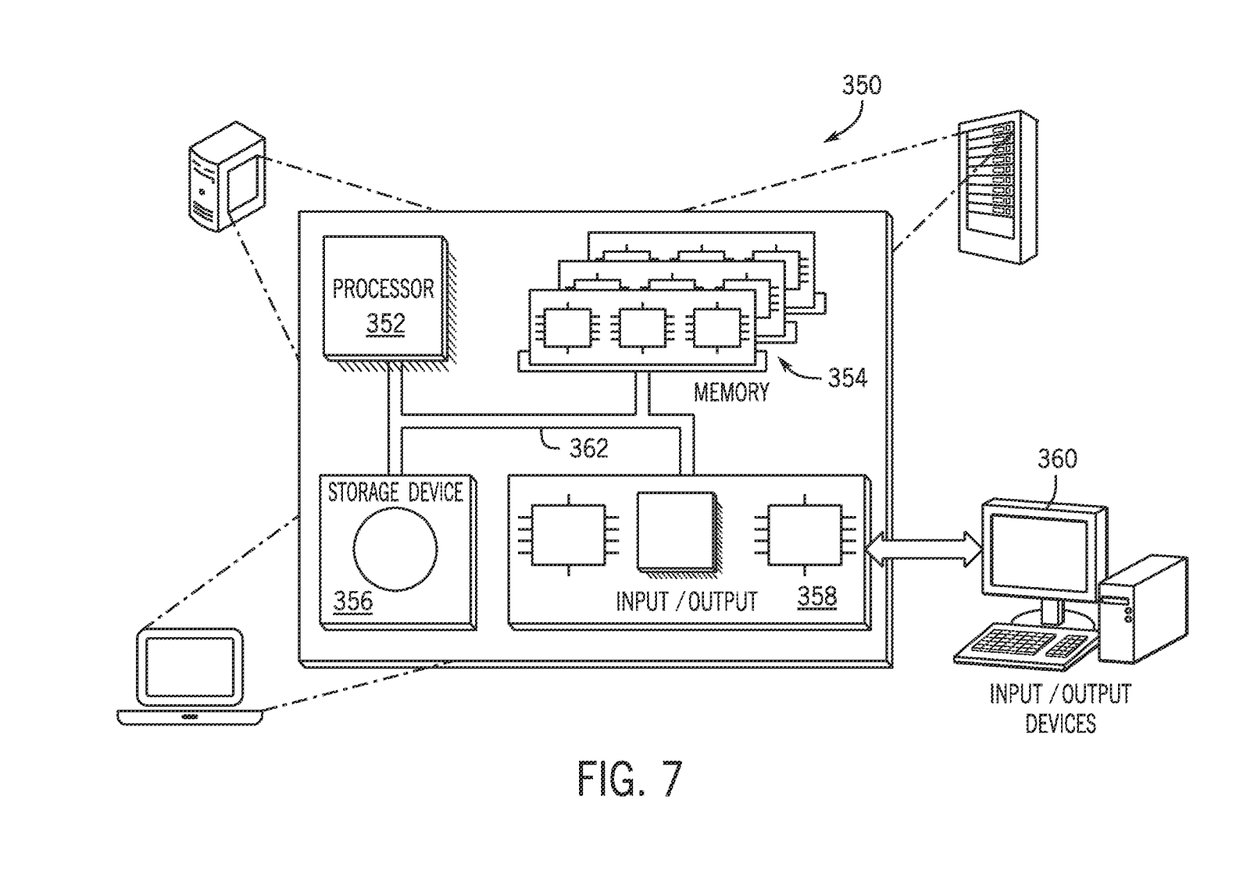
FIG. 7 is a schematic illustration of an example computing system, in accordance with an aspect of the present disclosure.

FIG. 7 illustrates an example computing system 350 that the embodiments described herein may use to perform their respective operations. The system 350 may be used for any of the operations described with respect to the various embodiments described herein, including the automated recommendation system 102 described herein. For example, the system 350 may be included, at least in part, in one or more of computing device(s) or system(s) described herein. In certain embodiments, the system 350 may include a processing system 352 having one or more processors, one or more memory 354, one or more storage devices 356, and one or more input/output (I/O) devices 360 controllable via one or more I/O interfaces 358. The various components 352, 354, 356, 358, or 360 may be interconnected via at least one system bus 362, which may enable the transfer of data between the various modules and components of the system 350.

In certain embodiments, the processing system 352 may be configured to process instructions for execution within the system 350. The processing system 352 may include single-threaded processor(s), multi-threaded processor(s), or both. The processing system 352 may be configured to process instructions stored in the memory 354 or on the storage device(s) 356. For example, the processing system 352 may execute instructions for various software instructions described herein. The processing system 352 may include hardware-based processor(s) each including one or more cores. The processing system 352 may include general purpose processor(s), special purpose processor(s), or both.

In certain embodiments, the memory 354 may store information within the system 350. In certain embodiments, the memory 354 includes one or more computer-readable media. The memory 354 may include any number of volatile memory units, any number of non-volatile memory units, or both volatile and non-volatile memory units. The memory 354 may include read-only memory, random access memory, or both. In certain embodiments, the memory 354 may be employed as active or physical memory by one or more executing software instructions.

In certain embodiments, the storage device(s) 356 may be configured to provide (e.g., persistent) mass storage for the system 350. In certain embodiments, the storage device(s) 356 may include one or more computer-readable media. For example, the storage device(s) 356 may include a floppy disk device, a hard disk device, an optical disk device, or a tape device. The storage device(s) 356 may include read-only memory, random access memory, or both. The storage device(s) 356 may include one or more of an internal hard drive, an external hard drive, or a removable drive.

One or both of the memory 354 or the storage device(s) 356 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 350. In certain embodiments, the CRSM may include a data store that provides storage of computer-readable instructions or other information in a non-transitory format. The CRSM may be incorporated into the system 350 or may be external with respect to the system 350. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processing system 352 and the memory 354 may be supplemented by, or incorporated into, one or more application-specific integrated circuits (ASICs).

In certain embodiments, the system 350 may include one or more I/O devices 360. The I/O device(s) 360 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 360 may also include one or more output devices such as a display, LED(s), an audio output device (e.g., a speaker), a printer, a haptic output device, and so forth. The I/O device(s) 360 may be physically incorporated in one or more computing devices of the system 350 or may be external on one or more computing devices of the system 350.

In certain embodiments, the system 350 may include one or more I/O interfaces 358 to enable components or modules of the system 350 to control, interface with, or otherwise communicate with the I/O device(s) 360. The I/O interface(s) 358 may enable information to be transferred in or out of the system 350, or between components of the system 350, through serial communication, parallel communication, or other types of communication. For example, the I/O interface(s) 358 may comply with a version of the RS-832 standard for serial ports, or with a version of the IEEE AA884 standard for parallel ports. As another example, the I/O interface(s) 358 may be configured to provide a connection over Universal Serial Bus (USB) or Ethernet. In certain embodiments, the I/O interface(s) 358 may be configured to provide a serial connection that is compliant with a version of the IEEE AA994 standard.

In certain embodiments, the I/O interface(s) 358 may also include one or more network interfaces that enable communications between computing devices in the system 350, or between the system 350 and other network-connected computing systems. The network interface(s) may include one or more network interface controllers (NICs) or other types of transceiver devices configured to send and receive communications over one or more communication networks using any network protocol.

Computing devices of the system 350 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 350 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, software instructions, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user 104, certain embodiments of the system 350 may be realized on a computer having a display device, e.g., a CRT (cathode ray tube) or LCD (liquid crystal display) monitor, for displaying information to the user 104 and a keyboard and a pointing device, e.g., a mouse or a trackball, by which the user 104 may provide input to the computer. Other kinds of devices may be used to provide for interaction with a user 104 as well; for example, feedback provided to the user 104 may be any appropriate form of sensory feedback, e.g., visual feedback, auditory feedback, or tactile feedback; and input from the user 104 may be received in any appropriate form, including acoustic, speech, or tactile input.

The embodiments described herein may be realized in a computing system 350 that includes a back-end component, e.g., as a data server, or that includes a middleware component, e.g., an application server, or that includes a front-end component, e.g., a client computer having a graphical user interface or a web browser through which a user 104 may interact with an with the system 350, or any appropriate combination of one or more such back-end, middleware, or front end components. The components of the system 350 may be interconnected by any appropriate form or medium of digital data communication, e.g., a communication network. Examples of communication networks include a local area network ("LAN") and a wide area network ("WAN"), e.g., the Internet.

In certain embodiments, the computing system 350 may include clients and servers. A client and server are generally remote from each other and typically interact through a communication network. The relationship of client and server arises by computer programs running on the respective computers and having a client-server relationship to each other.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user 104 to specify permission information, including individuals authorized to their information and/or constraints on such access.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computer-implemented automated recommendation system executed by at least one processor comprising:
   a weather monitoring system coupled to a communication interface and configured to receive weather event data from one or more weather monitoring sensors; and
   a processing system comprising one or more processors configured to:
   access location data of a user device associated with the user;
   identify a location of the user device based on the location data;
   determine that the location is associated with an upcoming weather event based on the weather event data;
   scan the user device for communications from an application different than the weather monitoring system associated with a warranty or insurance coverage of a product;
   extract product data from the communications based on the scan;
   associate the product data with an icon of a plurality of icons;
   cause display of the plurality of icons on a graphical user interface, wherein the plurality of icons are associated with one or more products of the user, and wherein the plurality of icons comprises a graphical representation of the one or more products of the user;
   receive a user selection of the icon to cause display of files storing the product data;
   provide a recommendation to move the one or more products of the user to a different location based on the upcoming weather event and based on user selection;
   receive confirmation of movement from a sensor associated with the one or more products;
   automatically send data related to the one or more products to a third party providing the coverage; and
   push a recommendation to the graphical user interface related to the one or more products based on receiving the confirmation, wherein the recommendation comprises a change to the coverage.

2. The system of claim 1, wherein the processing system is configured to:

adjust or discount insurance coverage for the one or more products based on the confirmation.

3. The system of claim 1, wherein the one or more products comprises a vehicle and wherein the location data is accessed from an on-board device or memory of the vehicle.

4. The system of claim 1, wherein the different location comprises a location of a parking garage associated with an altitude above an estimated highest meter estimate of flood water associated with the weather event.

5. The system of claim 1 wherein the processing system is configured to provide a reward to the user after receiving the confirmation of movement.

6. The system of claim 5 wherein the reward comprises discounted insurance coverage for the one or more products.

7. The system of claim 1 wherein the recommendation comprises initiating insurance claim processes.

8. The system of claim 1 wherein the processing system is in digital communication with an insurance application, an insurance company, or both.

9. The system of claim 1 wherein the processing system is configured to scan a plurality of third party applications on the user device to determine a status of the upcoming event.

10. The system of claim 1 wherein the processing system accesses a coverage status of the one or more products.

11. A computer-implemented automated recommendation system executed by at least one processor comprising:

a weather monitoring system coupled to a communication interface and configured to receive weather event data from one or more weather monitoring sensors; and a processing system comprising one or more processors configured to:

access location data of a user device associated with the user;

identify a location of the user device based on the location data;

determine that the location is associated with an upcoming weather event based on the weather event data;

scan the user device for communications from an application that is different than the weather monitoring system associated with a warranty or insurance coverage of a product;

extract product data from the communications from application the based on the scan;

associate the product data with an icon of a plurality of icons;

cause display of the plurality of icons on a graphical user interface, wherein the plurality of icons are associated with one or more products of the user, and wherein the plurality of icons comprises a graphical representation of the one or more products of the user;

receive a user selection of the icon to cause display of files storing the product data;

provide a recommendation to move the one or more products of the user to a different location based on the upcoming weather event and based on user selection; and receive an indication from a sensor associated with the one or more products that the one or more products were not moved; and appraising a value for a product replacement for the one or more products based on the indication, which is accessible via selection of the icon on the graphical user interface.

* * * * *